United States Patent
Vanderhoff (10) Patent No.: US 9,230,173 B2
(45) Date of Patent: Jan. 5, 2016

(54) SOFT DECISION MAKING PROCESSES FOR ANALYZING IMAGES

(75) Inventor: Earl W. Vanderhoff, Cranston, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1248 days.

(21) Appl. No.: 12/545,986

(22) Filed: Aug. 24, 2009

(65) Prior Publication Data

US 2011/0044538 A1    Feb. 24, 2011

(51) Int. Cl.
*G06K 9/00*    (2006.01)

(52) U.S. Cl.
CPC .................................. *G06K 9/00744* (2013.01)

(58) Field of Classification Search
None
See application file for complete search history.

(56) References Cited

U.S. PATENT DOCUMENTS

| 5,404,316 A * | 4/1995 | Klingler et al. ............... 715/723 |
| 5,751,450 A * | 5/1998 | Robinson ....................... 358/504 |
| 6,175,663 B1 * | 1/2001 | Huang ............................ 382/284 |
| 7,240,075 B1 * | 7/2007 | Nemirofsky et al. .................. 1/1 |
| 2002/0104094 A1 * | 8/2002 | Alexander et al. ............. 725/105 |
| 2004/0027453 A1 * | 2/2004 | Hasegawa et al. ............. 348/143 |
| 2007/0242877 A1 * | 10/2007 | Peters et al. ................... 382/167 |

\* cited by examiner

*Primary Examiner* — Eueng-Nan Yeh (57) ABSTRACT

A device may calculate a normalized value for each of a number of pixels in a frame of a video stream, by obtaining a first color from one of the pixels and a second color, by obtaining color components of the first color and the second color, by, for each of the color components, determining a distance between the first color and the second color, and by adding the distances of the color components to obtain the normalized value. In addition, the device may compute an accumulation of the normalized values, compare the accumulation to a threshold to determine whether a first image that includes the pixels matches a second image that includes the second color, and display a result of determining whether the first image matches the second image via a graphical user interface (GUI).

20 Claims, 11 Drawing Sheets

SOFT DECISION MAKING PROCESSES FOR ANALYZING IMAGES

BACKGROUND

The quality of video that a set-top box outputs may depend on both an encoded video signal that the set-top box receives from a remote video server and capabilities of the set-top box itself.

When the remote video server encodes a movie for transmission, the signal that the video server generates may depend on the precise starting point in the movie, at which the video server begins to encode the movie. Furthermore, due to noise, starting points for different encoding sessions may be different. Consequently, even from the same movie, the video server may be unable to generate an identical video signal.

When set-top boxes of the same make and model receive an encoded video signal from the same video server, the set-top boxes may generate different output video signals. There are many reasons for the differences. One reason may be that the set-top boxes use different decoding algorithms (e.g., different versions of a decoder). Another reason may be that the set-top boxes produce different amounts of noise in the output video signals. Yet another reason may be that, with respect to hue, color, and saturation, each set-top box may be calibrated differently from other set-top boxes. Yet another reason may be that each set-top box is designed to generate output video whose quality depends on a processing load of the set-top box, and the set-top boxes may be under different processing loads. For example, the set-top boxes may use a decoding algorithm in which rendering a particular frame depends on minute delays in processing.

DETAILED DESCRIPTION

The following detailed description refers to the accompanying drawings. The same reference numbers in different drawings may identify the same or similar elements. As used herein, the term "original image" or "sample image" may refer to a portion of an image or an image that is copied or obtained from another image. A sample image may be obtained from different sources, such as a camera, video stream, photograph, picture, etc. The term "compared image" or "compare image" may refer to an image that is compared to the sample image. The term "soft decision" may refer to a process in which the result of a decision is not expressed as one of two possible values (e.g., "yes" or "no," 1 or 0, true or false, etc.) but as a value in a range of real or rational numbers (e.g., 0 to 1, 0 to 100%, [1, 2], etc.). The term "white board" or "whiteboard" may refer to a memory for storing an image whose background is white.

As described herein, soft decision making processes may be used to analyze images. By implementing the soft decision making processes, a device may emulate a human's ability to analyze images better than devices that use a technique known as color quantization.

In one implementation, in analyzing images, the device may compare two images, remove a background from an image to obtain a foreground image, and/or detect the foreground image in other images. Although such a device may have different applications, in the following, the device will be described in context of a system for testing and/or controlling set-top boxes.

Figure 1:
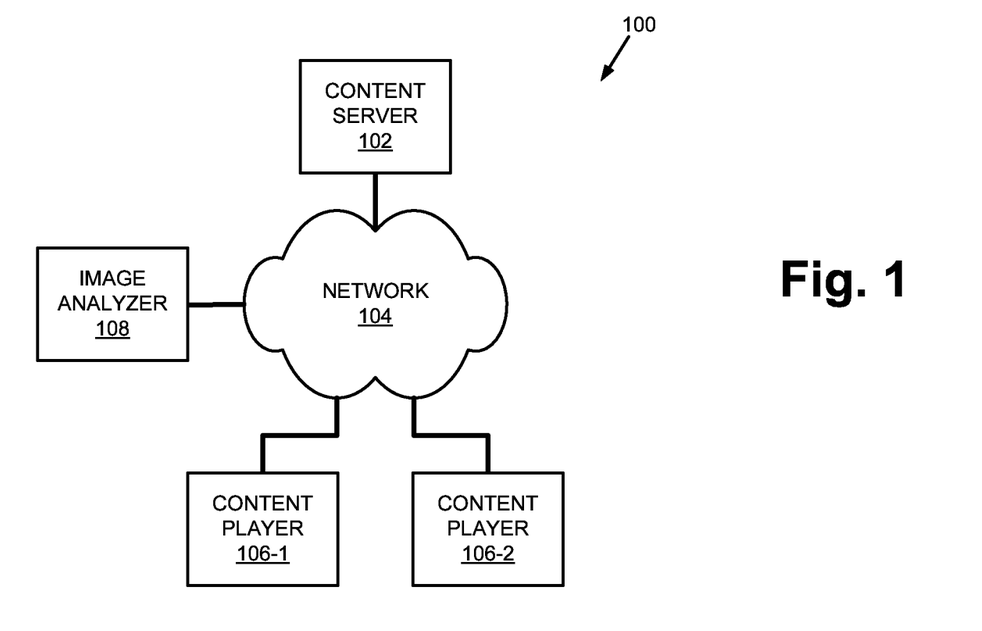
FIG. 1 shows a system in which concepts described herein may be implemented.

FIG. 1 illustrates a system 100 in which concepts described herein may be implemented. As shown, system 100 may include content server 102, local network 104, content players 106-1 and 106-2, and image analyzer 108. Content server 102 may include logic that transmits an encoded video stream over network 104 to content players 106-1 and 106-2. Network 104 may include a public (e.g., the Internet) and/or private network. Each of content players 106-1 and 106-2 (e.g., set-top boxes) may decode the encoded video stream from content server 102 and output the decoded video stream.

Image analyzer 108 may receive the decoded video streams from content players 106-1 and/or 106-2. In addition, image analyzer 108 may analyze or manipulate one or more images in the video streams. Image analyzer 108, for example, may compare two images, remove a background from an image to obtain a foreground image, and/or detect the foreground image in other images.

Figure 2A:
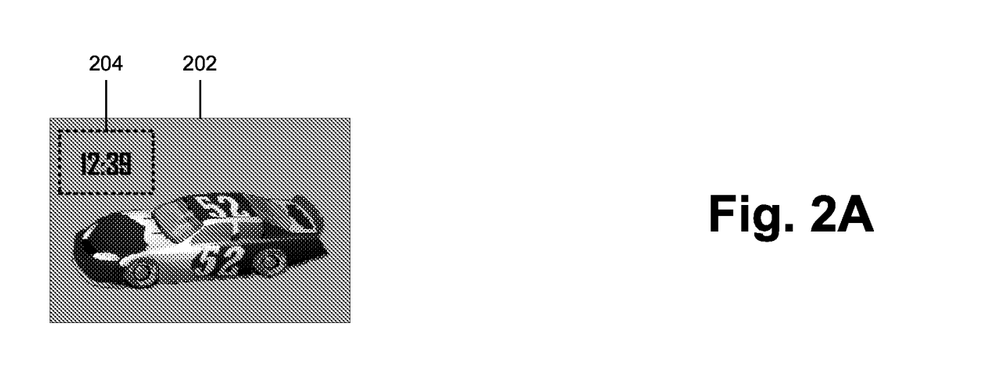
FIG. 2A illustrates exemplary image selection.

FIG. 2A illustrates selecting an image that is received as part of a decoded video stream at image analyzer 108. Assume that image analyzer 108 shows the decoded video stream to a user via a window, which is shown as frame 202. To select a sample image within frame 202, a user at image analyzer 108 may move a geometrical region 204, which is shown as a rectangle, within frame 202. When geometrical region 204 is placed over a portion of image that the user wishes to sample, the user may cause image analyzer 108 to capture or sample the portion of the image (e.g., click a mouse).

Figure 2B:
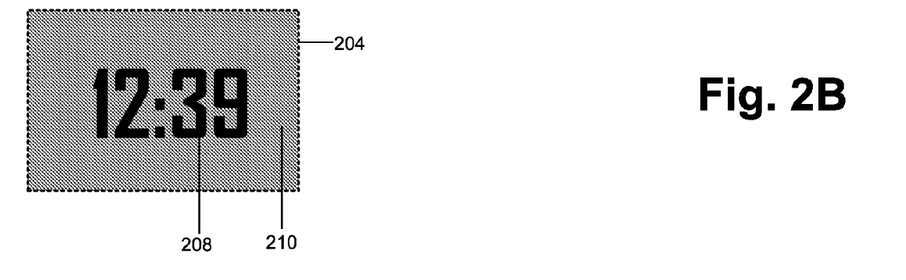
FIGS. 2B and 2C illustrate exemplary background removal.
Figure 2C:
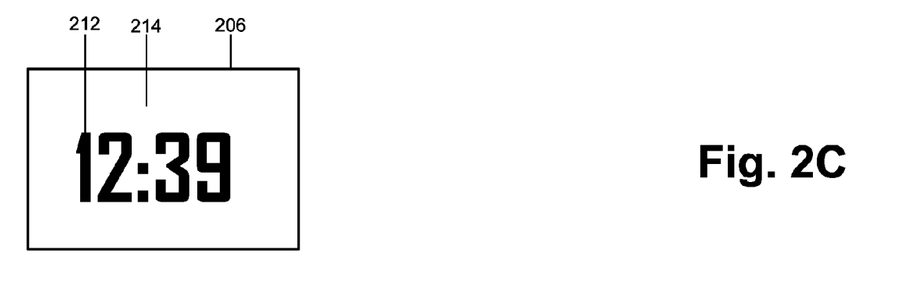

FIGS. 2B and 2C illustrate removing a background from the selected image. Proceeding with the preceding example, when the user causes image analyzer 108 to sample the image in geometrical region 204, image analyzer 108 may copy the image from within geometrical region 204 to a whiteboard 206 (FIG. 2C).

In copying the image from geometrical region 204 to whiteboard 206, image analyzer 108 may distinguish a foreground image 208 from a background image 210. More specifically, image analyzer 108 may copy foreground image 208 in geometrical region 204 onto whiteboard 206 as a foreground image 212, but copy background image 210 as a white image 214.

Once the selected image is sampled or "white boarded" onto whiteboard 206, the sampled image may be used to detect similar images within other images. For example, assume that the sampled image in whiteboard 206 image is obtained from a decoded video stream from content player 106-1. The user at image analyzer 108 may detect the sampled image in a decoded video stream from content player 106-2.

In some implementations, to manipulate the images as described above or otherwise, image analyzer 108 may quantize colors of the images. However, it is possible for the quantization to introduce undesirable effects.

Figure 2D:
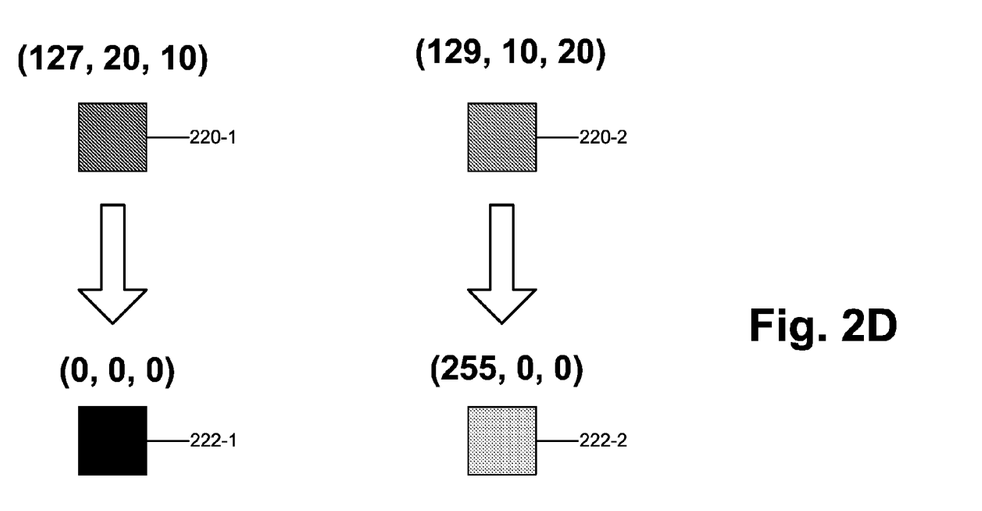
FIG. 2D illustrates quantizing colors and comparing the quantized colors.

FIG. 2D illustrates an example that illustrates quantizing colors and comparing the quantized colors. As shown, FIG. 2D shows two pixels 220-1 and 220-2. Assume that pixel 220-1 is from an image in a decoded video stream from content player 106-1, and that the decoded video stream is generated from an encoded video stream from content server 102. Also, assume that pixel 220-2 is from a corresponding image in a decoded video stream from content player 106-2, and that the decoded video stream from content player 106-2 is generated from the same encoded video stream from content server 102.

Assume that the color of pixel 220-1 in the Red-Green-Blue (RBG) color model is (127, 20, 10); that the color of pixel 220-2 is (129, 10, 20); and quantization converts any color in the range [0, 127] into 0, and any color in the range [128, 255] into 255.

As shown in FIG. 2D, in accordance with the preceding, image analyzer 108 quantizes the colors of pixels 220-1 and 220-2, which are (127, 20, 10) and (129, 10, 20) to (0, 0, 0) and (255, 0, 0), respectively. Because the red components of colors (0, 0, 0) and (255, 0, 0) are different, when image analyzer 108 compares the pixels 220-1 and 220-2, image analyzer 108 concludes that their colors do not match. Although the quantization allows image analyzer 108 to correctly conclude that green and blue components of the colors of pixels 220-1 and 220-2 to match, the quantization also causes image analyzer 108 to generate a false negative in comparing the red components of the colors. This is undesirable even if the images from which pixels 220-1 and 220-2 are obtained are slightly different, assuming that image analyzer 108 is designed to mimic the human ocular system in comparing the images. The difference between 127 and 129 in the red component of the pixels is relatively small, and a human may determine that pixels 220-1 and 220-2 match.

In the following description, instead of quantizing colors, image analyzer 108 (or similar logic) may use soft decision making processes for comparing two images, removing a background of an image to obtain a foreground image (e.g., a white boarded image), and/or detecting the foreground image in other images, etc. As described below in detail, the soft decision making processes may eliminate the undesirable effects that are associated with color quantization, and better emulate a human's ability to match different colors.

Figure 3:
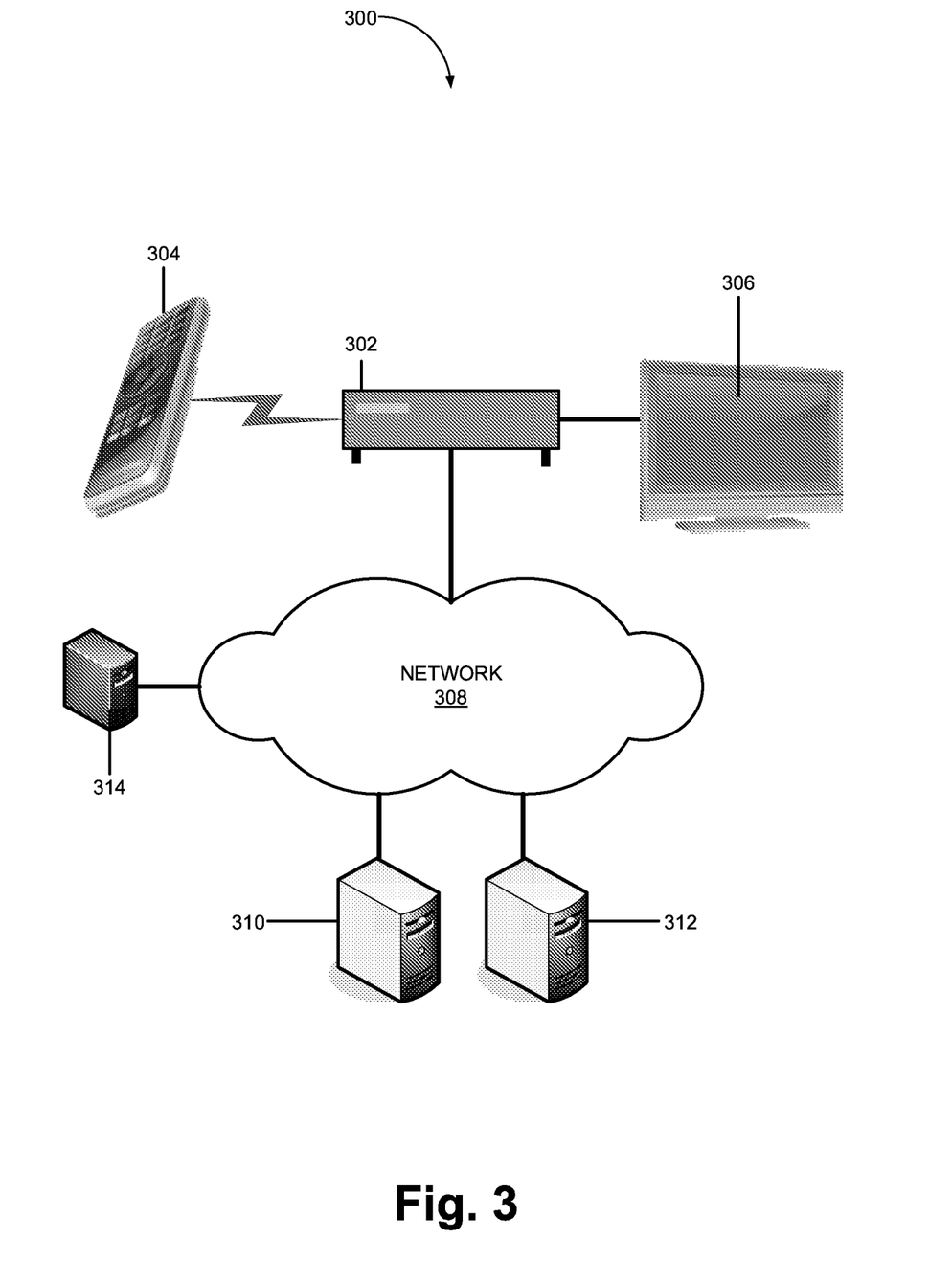
FIG. 3 shows an exemplary network in which the system of FIG. 1 may be implemented.

FIG. 3 is a block diagram of an exemplary network 300 in which system 100 may be implemented. As shown, network 300 may include a content player device 302 (e.g., a set-top box), remote control 304, content presentation device 306 (e.g., a television, stereo system, etc.), network 308, content server device 310, content storage device 312, and control device 314.

Content player device 302 may receive commands from remote control 304 and/or control device 314, receive content over network 308, and/or play the content on content presentation device 306. In some implementations, the content may be obtained from a content distribution system (e.g., a video/audio broadcast system) (not shown) via content-on-demand service (e.g., audio-on-demand or video-on-demand).

Examples of content player device 302 may include a set-top box or a component (e.g., a cable card) that plugs-into a host device (e.g., a digital video recorder, a personal computer, a television, stereo system, etc.) and allows the host device to display multimedia content (e.g., content on digital cable television channels). Although content player device 302 can be implemented as different types of devices (e.g., a set-top-box, computer, digital video disk (DVD) player, cable card, etc.), in the following, content player device 302 is described in terms of a set-top box.

Remote control 304 may include a device for issuing wireless commands to and for controlling electronic devices (e.g., a television, set-top box, stereo system, digital video disc (DVD) player, etc.). In one situation, remote control 304 may be used to obtain content-on-demand (e.g., video-on-demand). In different implementations, in place of remote control 304, other types of devices (e.g., a wireless keyboard, mouse, handheld device (e.g., cellular phone), etc.) may be used to control the electronic devices.

Content presentation device 306 may include a device for playing media signals and/or signals from content player device 302. Examples of content presentation device 306 may include a television, one or more speakers and a display, a portable digital assistant (PDA) or a cell phone capable of displaying a received video, etc. In the following paragraphs, content presentation device 306 is assumed to be a television for simplicity and ease of understanding.

Network 308 may include a fiber-optic network (e.g., passive optical networks (PONS)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks. Devices (e.g., content player device 302, content server device 310, etc.) that are shown in FIG. 3 may connect to network 308 via wireless or wired communication links. In addition, network 308 may allow any of devices 302-306 and 310-314 to communicate with any other device 302-306 and 310-314. In some embodiments, devices 302-306 and 310-314 may communicate with each other directly rather than through network 308.

Content server device 310 may include one or more devices for providing content and/or data. The content and/or data, and/or program may be sent to content player device 302 and/or content presentation device 306. For example, content server device 310 may provide video-on-demand (VOD), cable programs, etc. to content player device 302.

Content storage device 312 may include a database of units of content (e.g., a movie, a piece of music, a video clip, etc.). Based on a user request, content server device 310 may retrieve a particular unit of content from content storage device 312 for delivery to a content player device 302.

Control device 314 may include logic to test and/or control content player device 302. To test/control content player device 302, control device 314 may emulate remote control 304. For example, control device 314 may transmit command signals to content player device 302 over a wired connection to one of infrared ports of content player device 302.

To test a specific command on content player device 302, control device 314 may issue the command, cause content player device 302 to forward a decoded video stream to control device 314, and examine the video stream. Control device 314 may determine whether content player device 302 is operating correctly by analyzing images that are obtained from the video stream.

For example, to determine whether content player device 302 responds correctly to a command for changing the channel, control device 314 may instruct content player device 302 to tune to a specific station that is known to send an encoded video stream of a particular image (e.g., color bars). Control device 314 may then attempt to detect whether the particular image is present in the output video stream of content player device 302.

Depending on the implementation, network 300 may include additional, fewer, or different devices, or a different arrangement of the devices. For example, network 300 may include a content distribution system (e.g., a video/audio broadcast system), additional control devices, etc. Moreover, one or more devices of network 300 may perform one or more functions of another device of network 300. For example, content player device 302 and content presentation device 306 may be implemented as a single device. In another example, data or information stored on content storage device 312 may be stored on multiple devices.

In addition, although control device 314 is described as implementing soft decision making processes for image analysis/manipulation, depending on the implementation, a different type of network, system, or device may implement the soft decision making processes. For example, in one implementation, a device and/or program for analyzing or manipulating photographs may implement the soft decision making processes for comparing one photograph to another, for example, to detect copyright violations.

Figure 4:
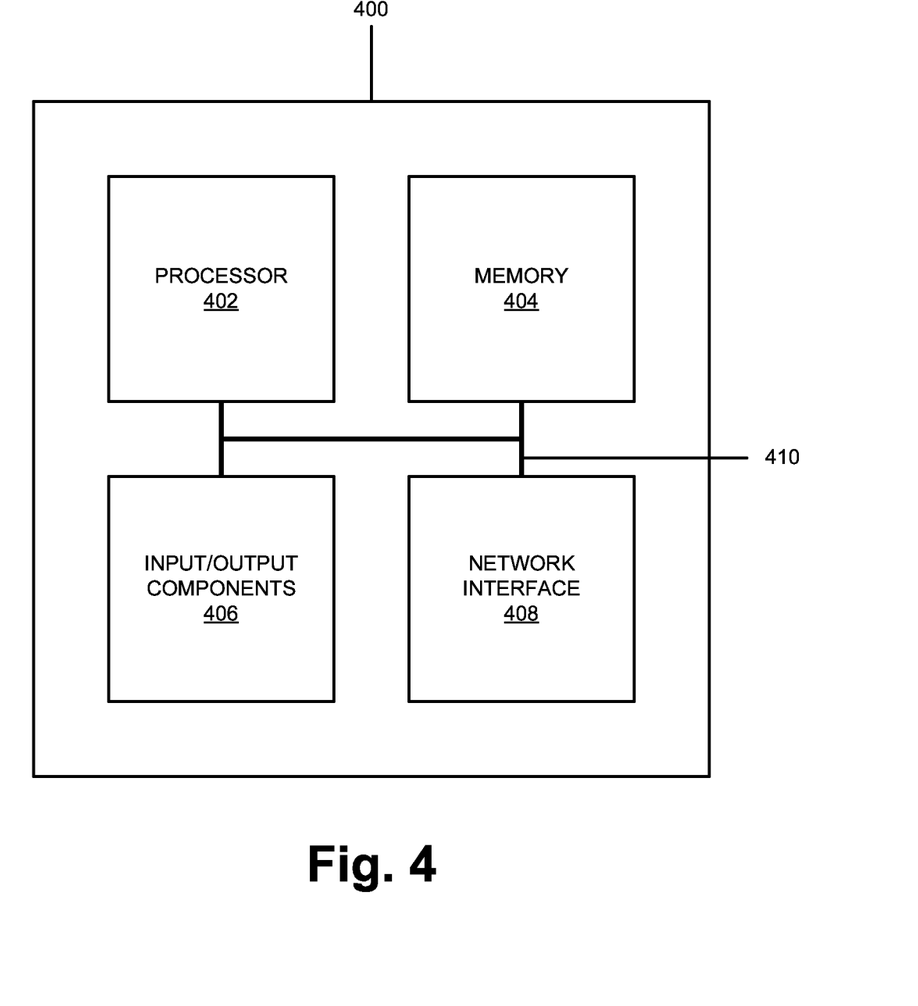
FIG. 4 is a block diagram of an exemplary device of FIG. 3.

FIG. 4 is a block diagram of an exemplary network device 400, which may correspond to content player device 302, content presentation device 306, content server device 310, content storage device 312, and/or control device 314. As shown, network device 400 may include a processor 402, a memory 404, input/output components 406, a network interface 408, and a communication path 410. In different implementations, network device 400 may include additional, fewer, or different components than the ones illustrated in FIG. 4. For example, network device 400 may include line interfaces, such as interfaces for receiving and forwarding data.

Processor 402 may include a processor, a microprocessor, an Application Specific Integrated Circuit (ASIC), a Field Programmable Gate Array (FPGA), and/or other processing logic capable of controlling network device 400. Memory 404 may include static memory, such as read only memory (ROM), and/or dynamic memory, such as random access memory (RAM), or onboard cache, for storing data and machine-readable instructions. Memory 404 may also include storage devices, such as a floppy disk, CD ROM, CD read/write (R/W) disc, and/or flash memory, as well as other types of storage devices.

Input/output components 406 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 400.

Network interface 408 may include any transceiver-like mechanism that enables network device 400 to communicate with other devices and/or systems. For example, network interface 408 may include mechanisms for communicating via a network, such as the Internet, a terrestrial wireless network (e.g., a WLAN), a satellite-based network, etc. Additionally or alternatively, network interface 408 may include a modem, an Ethernet interface to a LAN, and/or an interface/ connection for connecting network device 400 to other devices (e.g., a Bluetooth interface).

Communication path 410 may provide an interface through which components of network device 300 can communicate with one another.

Figure 5:
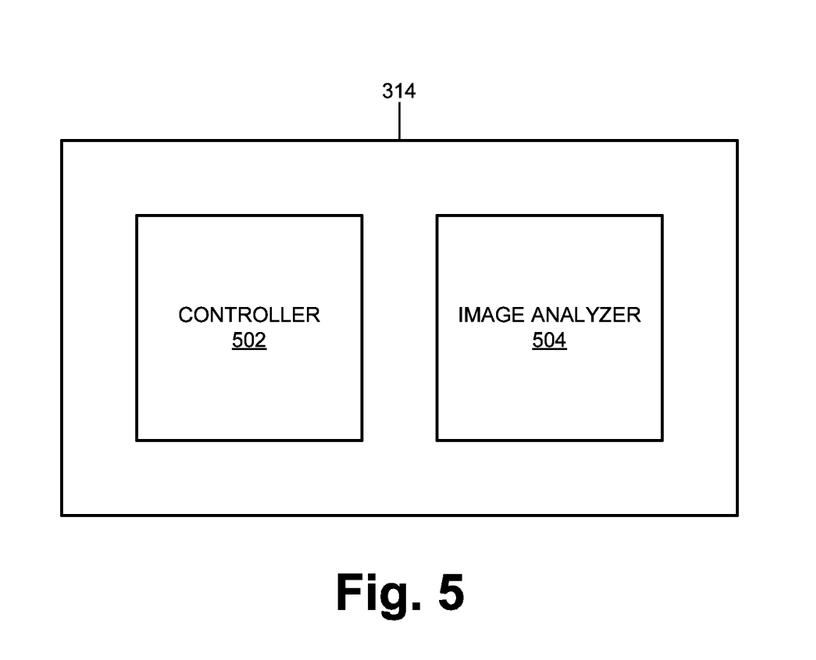
FIG. 5 is a functional block diagram of an exemplary control device of FIG. 3.

FIG. 5 is a functional block diagram of control device 314. As shown, control device 314 may include a controller 502 and image analyzer 504. Although not illustrated, control device 314 may include additional components, such as components illustrated in network device 400, an operating system (e.g., Linux, Windows, etc.), an application, a component for issuing remote commands to content player device 302, etc.

Controller 502 may schedule and/or perform transmission of commands for controlling content player device 302 (e.g., a command to change the channel). In addition, controller 502 may verify whether a transmitted command has failed. A command may fail for several reasons, such as, for example, the command has not been sent correctly (e.g., due to a failure of an infrared transmitter); an infrared input or processing at content player device 302 may not be operating correctly; content player device 302 may be unable to output a decoded video stream; etc.

Controller 502 may perform the verification of the command by obtaining an output video stream of content player device 302 and by using image analyzer 504 to analyze images that are in the video stream. For example, controller 502 may detect, via image analyzer 504, a specific image (e.g., embedded station-identification text, channel number, or a specific image overlaying content, color bars for a local channel, etc.) in the video stream, to verify that the command resulted in correctly changing the channel. In another example, controller 502 may send a separate command that will generate a video activity (e.g., game show, soap opera, etc.) at a tuned channel, and may identify anticipated images at the tuned channel. In yet another example, controller 502 may verify tuned channel/program from a video menu, by requesting additional information by, for example, issuing an information-requesting command or selecting an item on a menu guide.

In verifying the success of commands, controller 502 may avoid pitfalls that are associated with an approach that uses program schedules. For example, one approach may be to obtain a schedule of channel programs. Based on the schedule, controller 502 may attempt to determine what scenes or image should appear in the video stream when a particular command is executed at content player device 302, and, after the execution of the command, may attempt to detect the scenes at the video output of content player device 302. This approach may be problematic, because the schedule and/or channels that are assigned to particular stations may frequently and unpredictably change.

Image analyzer 504 may obtain a decoded video stream from content player device 302, analyze the decoded video stream, and provide the result of the analysis to controller 502 and/or a user. For example, image analyzer 504 may compare one image to another image, select or sample an image in a video stream, remove a background of the image to obtain a foreground image, detect the foreground image in other images, etc. In analyzing these images, image analyzer 504 may use soft decision making processes.

Figure 6A:
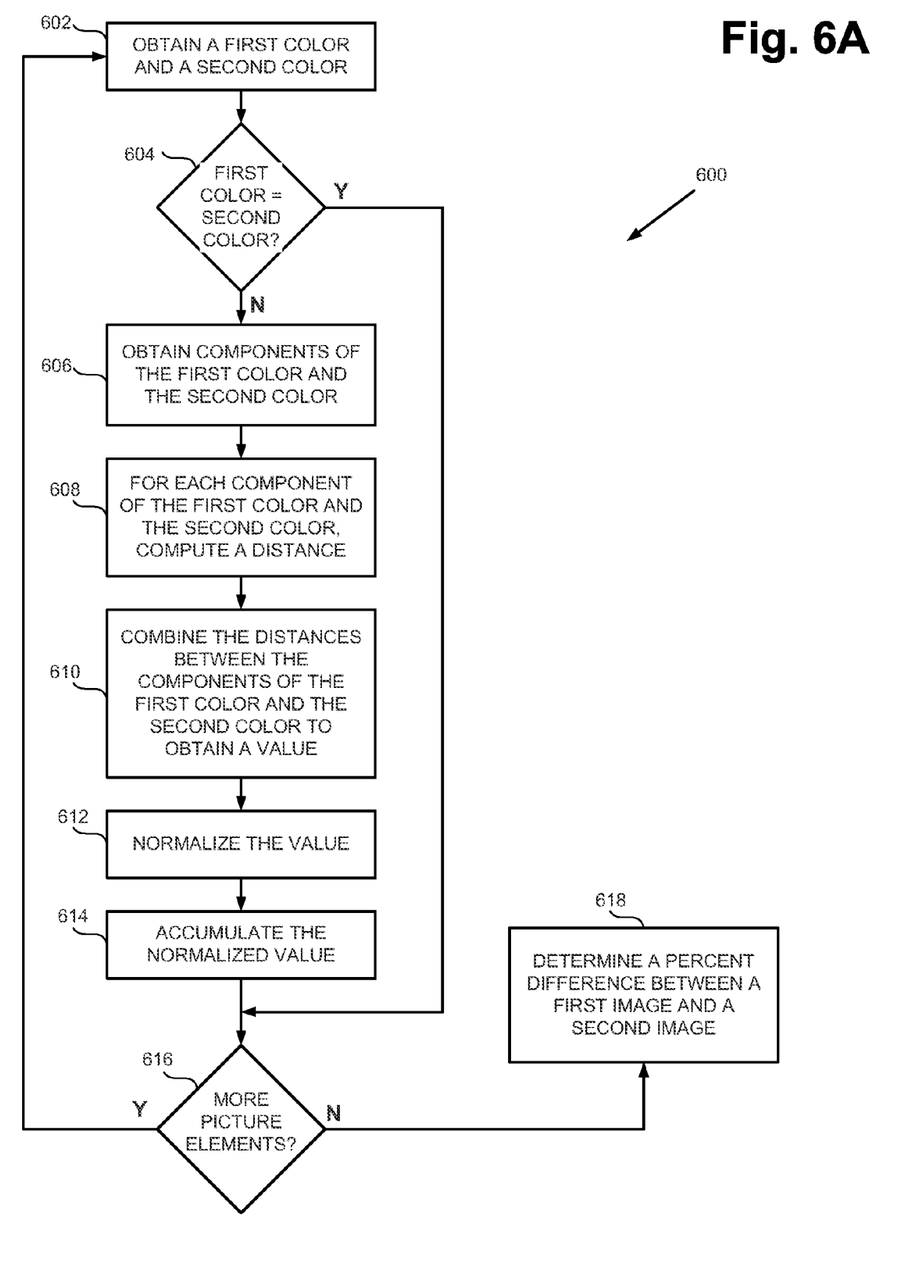
FIG. 6A is a flow diagram of an exemplary soft decision making process for comparing two images.

FIG. 6A is a flow diagram of an exemplary soft decision making process 600 for comparing two images. Assume that controller 502 has caused image analyzer 504 to obtain two images, a first image and a second image, from a video stream(s). In addition, assume that two arrays or vectors, A and B, represent the first image and the second image, respectively, and that colors of $i^{th}$ pixel of the first image and the second image may be written as A(i) and B(i), respectively, where i is a non-negative integer. Process 600 may begin with image analyzer 504 obtaining a first color of a first pixel from the first image and a second color of a second pixel from the second image (block 602). Image analyzer 504 may obtain $A(i)$ and $B(i)$ from, for example, the images stored in a memory (e.g., memory 404).

Image analyzer may determine whether the first color is the same as the second color (block 604). For example, in one implementation, image analyzer 504 may compare if $A(i)$ is equal to $B(i)$ to determine if the colors are the same. If the first color is the same as the second color (block 604—YES), process 600 may proceed to block 616 (to be described below).

Otherwise (block 604—NO), image analyzer 504 may obtain color components of the first color and color components of the second color (block 606). Depending on the implementation, a color (e.g., $A(i)$) may represent color components (e.g., red, green, and blue in RGB representation) in accordance with a specific encoding scheme.

Figure 6B:
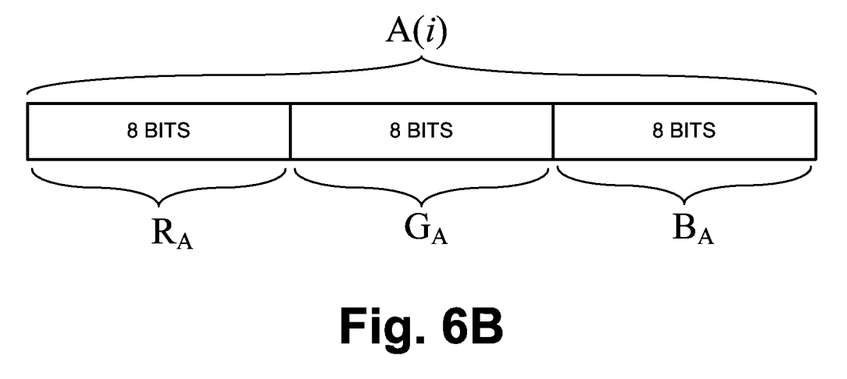
FIG. 6B illustrates an exemplary scheme for representing color components of a pixel.

FIG. 6B illustrates one exemplary scheme for representing the color components of $A(i)$. As shown, in the scheme, color components of $A(i)$ include red $R_A$, green $G_A$, and blue $B_A$. In addition, the most significant 8 bits, the second most significant 8 bits, and the least significant 8 bits of $A(i)$ represent $R_A$, $G_A$, and $B_A$, respectively. In this example, image analyzer 504 may obtain $B_A$ by masking out the upper 16 bits of $A(i)$, $G_A$ by shifting $A(i)$ eight bits to the right and masking out the upper 16 bits, and $R_A$ by shifting $A(i)$ 16 bits to the right and masking out the upper 16 bits. In a different implementation, image analyzer 504 may use other computational operations that are equivalent to bitwise shifting and/or masking bits (e.g., dividing or multiplying by 2, computing modulo (e.g., 10 modulo 256) of a result of the shifting, etc.) to obtain the color components. Image analyzer 504 may obtain the color components of $B(i)$ (e.g., $R_B$, $B_B$, and $G_B$) similarly.

For each color component of $A(i)$ and $B(i)$, image analyzer 504 may compute a distance (block 608). For example, assume that a distance D between one color component and another color component is given by the absolute value of a numerical difference of the color components. Then, image analyzer 504 may compute a distance for red, $D_R = ABS(R_A - R_B)$, for green, $D_G = ABS(G_A - G_B)$, and for blue, $D_B = ABS(B_A - B_B)$, where $ABS(.)$ represents the absolute value of a quantity in the parenthesis. Depending on the implementation, image analyzer 504 may use a different metric for determining the distance between the color components. For example, in one implementation, image analyzer 504 may determine the distance by computing a numerical difference of the color components without computing absolute values.

Image analyzer 504 may combine the distances between the colors components of the first color and the second color to obtain a value (block 610). Continuing with the above example, assume that V represents the value. In one implementation, image analyzer 504 may determine V by adding the differences determined at block 608. Therefore, $V = D_R + D_G + D_B$. In a different implementation, image analyzer 504 may combine the distances in accordance with a different scheme.

Image analyzer 504 may normalize the value (block 612). In one implementation, for example, V may be normalized by multiplying V with a pre-determined coefficient $C_f$ to obtain a normalized value, $V_N$. In some implementations, if $V_N > 1.0$, image analyzer 504 may reset or cap $V_N$ such that $V_N = 1.0$.

Image analyzer 504 may accumulate the normalized value (block 614). In one implementation, image analyzer 504 may accumulate the normalized value by adding the value to an accumulated value obtained in a prior performance of blocks 602-616. For example, assume that $V_N$ in a first iteration of blocks 602-614 is 0.2 and is 0.3 in a second iteration. The accumulated value is $0.2 + 0.3 = 0.5$. The accumulated value may increase as image analyzer 504 iterates through blocks 602-614.

Image analyzer 504 may determine whether there are additional pixels for further processing (block 616). If there are additional pixels (block 616—YES), process 600 may return to block 602.

Otherwise, image analyzer 504 may determine a percent difference between the first image and the second image (block 618). In one implementation, image analyzer 504 may determine the percent difference by dividing the accumulated value by the total number of pixels. For example, assuming that T is the total number of pixels, $A_V$ is the accumulated value, and P is the percent difference, image analyzer 504 may determine P in accordance with $P = A_V \cdot 100 / T$.

In image analysis or processing, image analyzer 504 may remove a background from a sample image to obtain a foreground image. Image analyzer 504 may use the resulting foreground image, herein termed "white boarded image" or "whiteboard image," for further image analysis (e.g., detecting the presence of the foreground image in other images).

Figure 7:
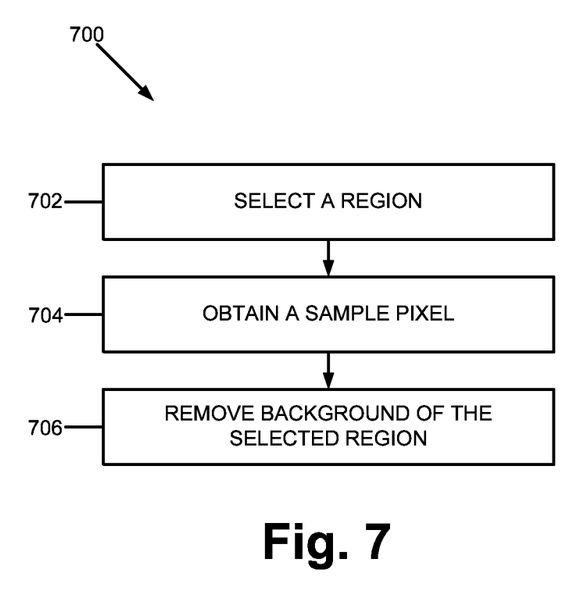
FIG. 7 is a flow diagram of an exemplary process for obtaining a foreground image.

FIG. 7 is a flow diagram of an exemplary process for obtaining a foreground image. Assume that image analyzer 504 has captured a frame of a decoded video stream, and shows the frame (e.g., frame 202) to a user via its graphical user interface (GUI). Process 700 may begin with a selection of a region or area in the frame (block 702). For example, as illustrated in FIG. 2A, a user may indicate, via movable geometrical region 204, an area that the user wants to capture as a sample image. In response, image analyzer 504 may select the area (e.g., store the coordinates of a rectangle encompassing the area).

Image analyzer 504 may obtain a sample pixel (block 704). In one implementation, the user may move a mouse cursor over frame 202 until the mouse cursor is over a pixel that is representative of the color of the foreground image, and click the mouse to instruct image analyzer 504 to sample the pixel. In another implementation, image analyzer 504 may sample a pixel that is at the center of the selected region (see block 702).

Using the sample pixel, image analyzer 504 may remove the background of the image in the selected region in accordance with a soft decision making process (block 706).

Figure 8:
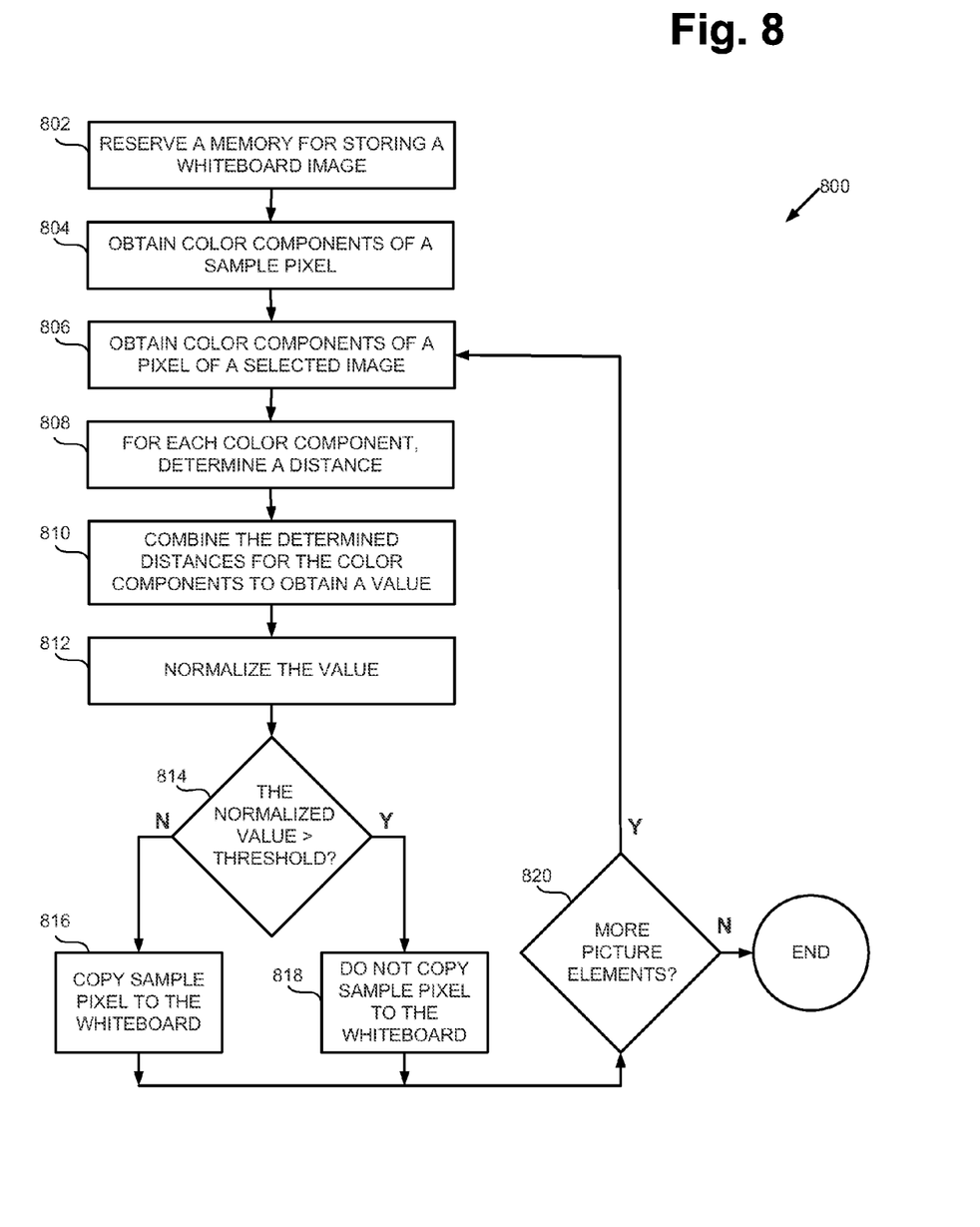
FIG. 8 is a flow diagram of an exemplary soft decision making process for removing the background of an image.

FIG. 8 is a flow diagram of an exemplary soft decision making process for removing the background of an image. It is assumed that an image has been selected and that a sample pixel has been obtained, as described above for blocks 702 and 704. Process 800 may begin at block 802, where image analyzer 504 reserves a memory for storing a white boarded image (block 802). For the example below, assume that $W(i)$ represents either the $i^{th}$ pixel of the white boarded image, or a portion of the reserved memory that stores the pixel.

Image analyzer 504 may obtain color components of the sample pixel (see block 704) (block 804). Assume that X represents the sample pixel and encodes the color of the sample pixel in the manner $A(i)$ encodes a color (see FIG. 6B). In such a case, image analyzer 504 may obtain the color components, $R_X$, $G_X$, and $B_X$ of X in a manner similar to that for obtaining the color components of $A(i)$.

Image analyzer 504 may obtain color components of a pixel of the selected image (block 806). Assume that $S(i)$ represents $i^{th}$ pixel of the selected image and encodes the color components as $A(i)$ encodes a color. In such a case, image analyzer 504 may obtain the color components, $R_S$, $G_S$, and $B_S$ of S(i) in the same manner that color components are obtained for A(i).

For each color component, image analyzer 504 may determine a distance (block 808). For example, using the same distance metric described at block 608, image analyzer 504 may compute distance for the red component $D_R$ as $ABS(R_X-R_S)$, a distance for the green component $D_G$ as $ABS(G_X-G_S)$, and a distance for the blue component $D_B$ as $ABS(B_X-B_S)$.

Image analyzer 504 may combine the determined distances to obtain a value (block 810). Continuing with the preceding example, and assuming V is the value, image analyzer 504 may compute $V=D_R+D_G+D_B$.

Image analyzer 504 may normalize the value (block 812). As discussed above for block 612, image analyzer 504 may multiply the value V by some predetermined coefficient, $Y_F$, to obtain a normalized value, $V \cdot Y_F$.

Image analyzer 504 may determine whether the normalized value is greater than a particular threshold (e.g., a threshold of 1) (block 814). For example, image analyzer may determine whether $V \cdot Y_F > 1$. If the normalized value is greater than the threshold (block 814—YES), image analyzer 504 may determine that the color of the sample X does not match the color of S(i) (block 818). In such a case, image analyzer 504 may store a value representing the white color at a corresponding location in the memory reserved for the whiteboard. That is, assuming that W(i) stores the $i^{th}$ pixel of the white boarded image and H represents the white color, image analyzer 504 may store H at W(i). That is, W(i)=H.

If the normalized value is not greater than the threshold, image analyzer 504 may determine that the color of the sample pixel X matches the color of S(i) (block 816). In such a case, image analyzer 504 may copy the pixel of the sample image in the white board. That is, W(i)=S(i).

If the normalized value is not greater than the threshold, image analyzer 504 may determine that the color of the sample pixel X matches the color of S(i). In such a case, image analyzer 504 may copy the pixel of the sample image in the white board. That is, W(i)=S(i).

At block 820, image analyzer 504 may determine if there are more pixels to be processed (block 820). If there are more pixels, process 800 may loop back to block 806. Otherwise, process 800 may terminate. At the end of process 800, a white boarded image, which is the foreground image of the sample image, is stored in the reserved memory (see block 802). If the white boarded image is not satisfactory for the user at image analyzer 504, the user (and therefore, image analyzer 504) may repeat process 700 or 800 to obtain a new white boarded image.

In analyzing images, image analyzer 504 may use the sampled pixel (see block 804) and the white boarded image obtained at process 800. For example, image analyzer 504 may detect the white boarded image (e.g., the foreground image) in another image.

Figure 9:
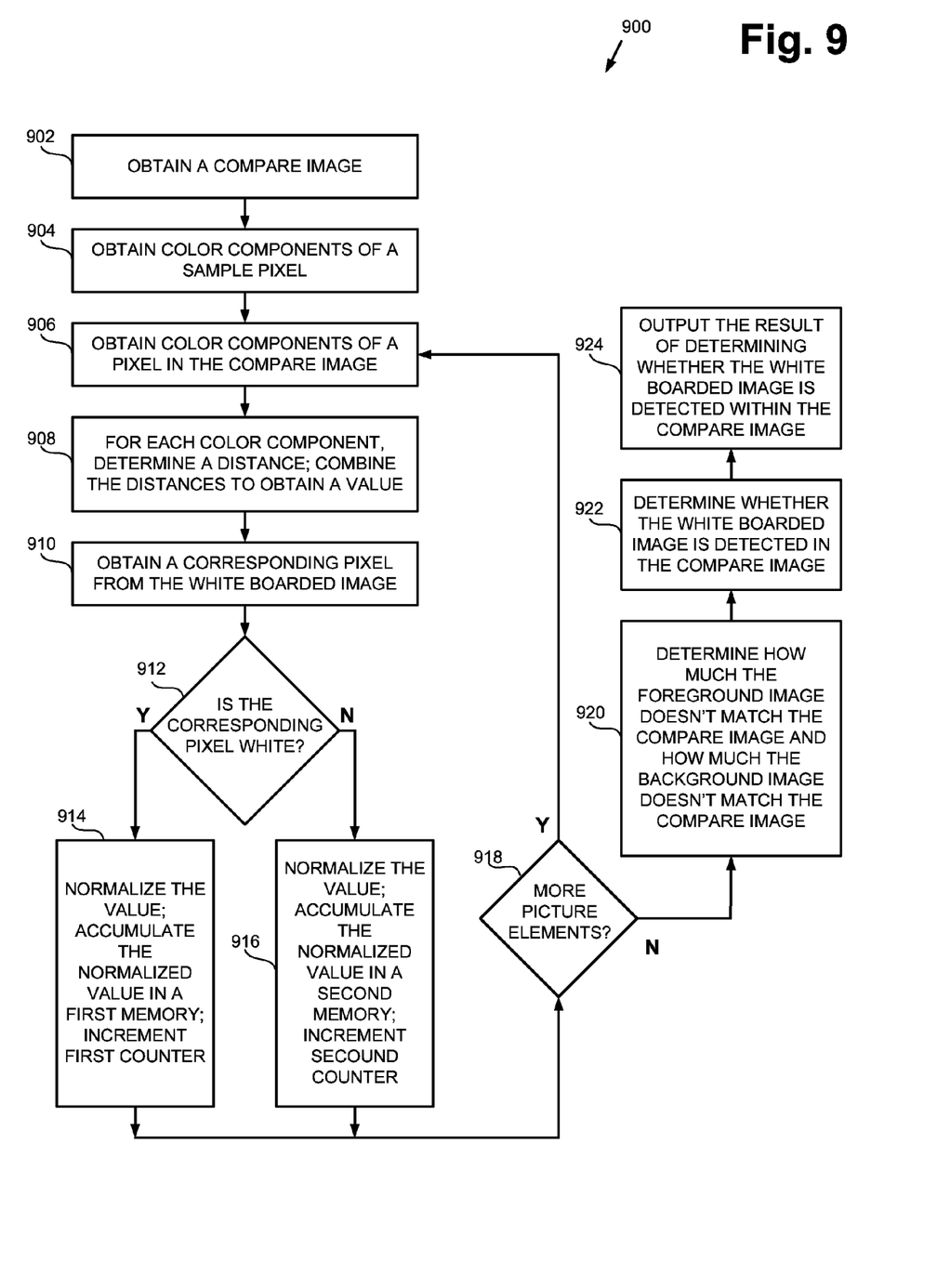
FIG. 9 is a flow diagram of an exemplary soft decision making process for detecting a foreground image in another image.

FIG. 9 is a flow diagram of an exemplary soft decision making process for detecting/extracting a white boarded image in another image. Assume that image analyzer 504 has obtained a white boarded image (e.g., a foreground image) from a specific area within a frame (e.g., frame 202) and a sample pixel.

Image analyzer 504 may obtain a compare image (block 902). For example, image analyzer 504 may obtain the compare image by first obtaining a compare frame in a video stream. Once the compare frame is obtained, image analyzer 504 may copy the image in an area at the same location in the compare frame as the white boarded image in the frame from which the sample image is obtained. For example, assume that the white boarded image is rectangular, and that the X-Y screen coordinates of the upper left corner of the white boarded image within the sample image (e.g., image from which the white boarded image is created) is (10,10). In such an instance, image analyzer 504 may obtain the compare image from the compare frame at the same coordinates (10, 10).

Image analyzer 504 may obtain the color components of a sample pixel (block 904). Image analyzer 504 may obtain the color components in a manner similar to that described for block 804. In one implementation, instead of obtaining the color components, image analyzer 504 may determine the average foreground color of the white boarded image, and obtain the color components of the average foreground color.

Image analyzer 504 may obtain the color components of a pixel in the compare image (block 906). Image analyzer 504, for each color component, may determine a distance between the pixel in the compare image and the sample pixel (block 908), and combine the distances of the color components to obtain a value V, and normalize the value (e.g., by multiplying by a constant) (block 908).

Image analyzer 504 may obtain, from the white boarded image, a pixel whose location corresponds to that of the pixel from the compare image (block 910). In one implementation, the location may be determined based on the X-Y coordinates of the pixel in the compare image.

At block 912, image analyzer 504 may determine whether the corresponding pixel in the whiteboard is white (block 912). For example, image analyzer 504 may test whether the sum of the red, green, and blue components of the pixel is equal to 765 (e.g., R+G+B=765). In another example, image analyzer 504 may test whether all of the bits of the pixel are 1's.

If the corresponding pixel is white (block 912—YES), image analyzer 504 may determine that the pixel in the compare image is part of the background, and compute parameters for determining a dissimilarity between the background color of the compare image and the foreground color of the sample image (e.g., the color of the sample pixel). Such parameters measure the likelihood of the background of the compare image being misinterpreted as the foreground of the sample image (e.g., a likelihood of providing a false positive).

For example, assuming that the value obtained at block 908 is represented by V, image analyzer 504 may multiply V by a coefficient C (e.g., 0.007) to obtain a normalized value $V_N$ (block 914). $V_N$ may be capped at some predetermined constant (e.g., 1.0) (see the above description of block 612). In addition, at block 914, image analyzer 504 may accumulate normalized values $V_N$ in a first memory (e.g., a piece of memory in memory 404) to obtain accumulated value $A_B$, and increment a first counter for tracking the number of times (n) block 914 is performed (block 914). n is also equal to the number of pixels in the background of the compare image. The accumulated value $A_B$ and n may increase as image analyzer 504 iterates through blocks 906-914 and 918.

If the corresponding pixel is not white (block 912—NO), image analyzer 504 may determine that the pixel in the compare image is part of the foreground, and compute parameters for determining a dissimilarity between the foreground color of the compare image to the foreground color of the white boarded image (e.g., the color of the sample pixel). Continuing with the preceding example, image analyzer 504 may multiply a coefficient U (e.g., 0.002) by V to obtained a normalized value $V_M$ (block 916). Coefficient U may be different from coefficient C referenced above.

$V_M$, like $V_N$, may be capped at some predetermined constant (e.g., 1.0). In addition, at block 916, image analyzer 504 may accumulate normalized values $V_M$ in a second memory to obtain accumulated value $A_F$, and increment a second counter (m) for tracking the number of times block 916 is performed (block 916). m is also equal to the number of pixels that are in the foreground of the compare image.

At block 918, image analyzer 504 may determine whether there are additional pixels for further processing (block 918). If there are additional pixels (block 918—YES), process 900 may loop back to block 906. Otherwise, image analyzer 504 may determine how much each of the foreground and background images does not match the compare image (block 920). Continuing with the example, image analyzer 504 may calculate % foreground mismatch ($M_F$) by calculating $100 \cdot A_F/m$, and % background mismatch ($M_B$) by calculating $100 \cdot A_B/n$.

Image analyzer 504 may determine whether the white boarded image is detected in the compare image (block 922). In some instances, image analyzer 504 may determine that the white boarded image is detected in the compare image solely based on the foreground mismatch. In other instances, image analyzer 504 may determine that the white boarded image is detected in the compare image if either the background mismatch is greater than a predetermined background threshold ($T_B$) or the foreground mismatch is less than a predetermined foreground threshold ($T_F$). By determining $M_B > T_B$ and/or $M_F < T_F$, image analyzer 504 may reduce the possibility of obtaining a false positive detection of the white boarded image in the compare image. For example, image analyzer 504 may conclude that the compare image does not include the white boarded image if either $M_B \leq T_B$ or $M_F \geq T_F$.

Image analyzer 504 may output the result of determining whether the white boarded image is detected within the compare image (block 924). Put differently, image analyzer 504 may output the result of performing block 922, for example, via a GUI, email, web page, etc.

Figure 10:
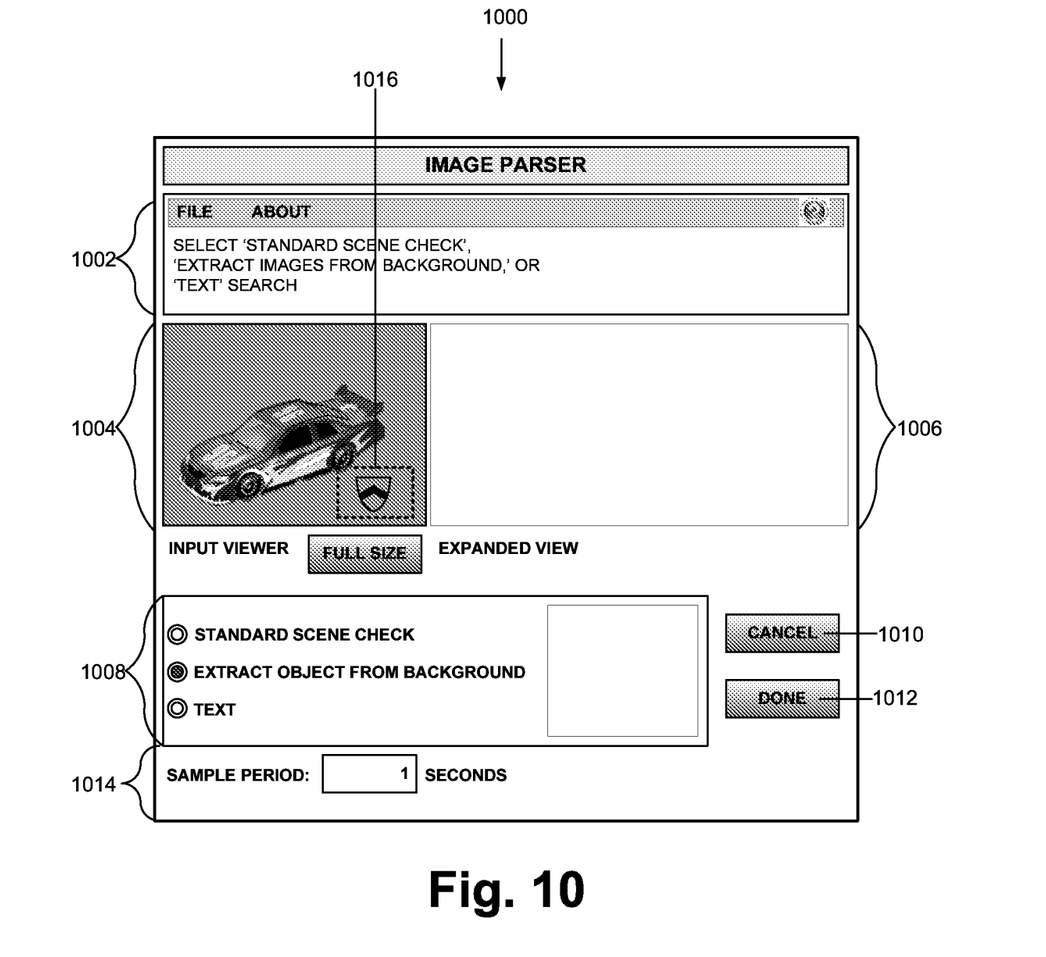
FIG. 10 shows a graphical user interface (GUI) window of an exemplary image analyzer of FIG. 5.

FIG. 10 illustrates a GUI window 1000 of image analyzer 504. As shown, GUI window 1000 may include an instruction pane 1002, video frame pane 1004, expanded view pane 1006, option pane 1008, cancel button 1010, done button 1012, and sampling pane 1014. Depending on the implementation, GUI window 1000 may include additional, fewer, or different components than those illustrated in FIG. 10. For example, when image analyzer 504 is implemented as part of a photograph analysis application, GUI window 1000 may include a pane for selecting a different album, edit menus for annotating, cropping, resizing, rotating, and/or performing other types of image operations.

Instruction pane 1002 may list or explain the type of analysis or operation that a user may perform. For example, in FIG. 10, instruction pane 1002 shows that the user may select a "standard scene check" for detecting a sampled image within a video stream, "extract images from background" for sampling an image and removing a background from the sampled image (e.g., white boarding the image), or "text search" for identifying text within a region (e.g., geometrical region 204).

Video frame pane 1004 may show a video stream. Although not illustrated in FIG. 10, window 1000 may provide GUI components for controlling the video stream (e.g., pause, resume, etc.). Expanded view pane 1006 may show, when activated, an enlarged portion of video frame pane 1004. Option pane 1008 may provide GUI components that correspond to each of the options that are described in instruction pane 1002. As shown, the user may select a radio button that corresponds to one of "standard scene check," "extract object from background," and "text."

Cancel button 1010 and done button 1012, when activated, may cause image analyzer 504 to stop performing the analysis or operation selected via option pane 1008. Cancel button 1010, however, may be activated when image analyzer 504 is performing an analysis. Done button 1012 may be activated when image analyzer 504 has already compared a sample image to a compare image, and is continuing to compare the sample image to additional images in a video stream. In such a situation, when a user presses done button 1012, image analyzer 504 may stop comparing the images and save parameters that are associated with the compared images (e.g., percent match). Sampling pane 1014 may include an input box, in which the user can type or select a time interval for periodically sampling a frame from a video stream.

As further shown in FIG. 10, frame pane 1004 may include rectangular sampling area 1016 (e.g., geometrical region 204). Via the GUI, the user may move sampling area 1016 within frame plane 1004, to indicate an area of image that is to be sampled.

Figure 11A:
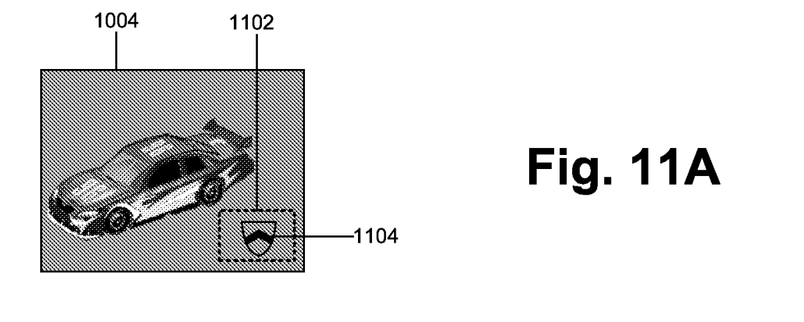
FIGS. 11A and 11B illustrate sampling an image and removing the background from the sampled image.
Figure 11B:
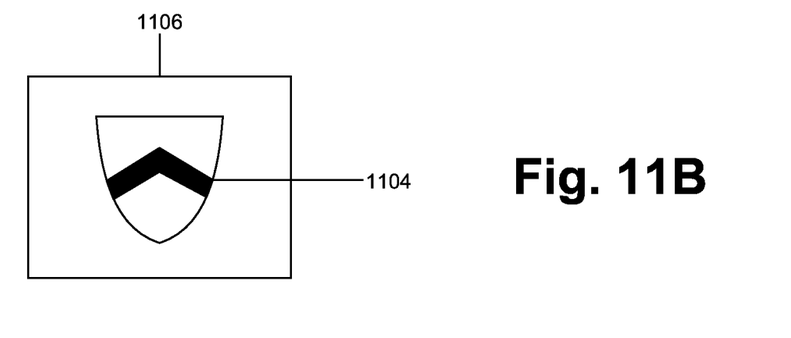

FIGS. 11A and 11B illustrate removing a background from the image in frame pane 1004. As shown in FIG. 11A, when sampling area 1102 is over a desired portion of the framed image, such as a chevron insignia 1104, the user may activate sampling area 1102 (e.g., click on a mouse) to sample the desired portion. Upon detecting the user's action, image analyzer 504 may remove the background of the image in sampling area 1102 to obtain a white boarded image of chevron insignia 1104 in accordance with process 800.

FIG. 11B shows a whiteboard 1106. As shown, whiteboard 1106 includes chevron insignia 1104. At later times, the user at image analyzer 504 may compare the white boarded image in whiteboard 1106 to images in frames of different video streams. When image analyzer 504 detects a frame that includes chevron insignia 1104, image analyzer 504 may alert the user of the detection.

In the foregoing description, image analyzer 504 (or similar logic) may use soft decision making processes for analyzing/manipulating images. For example, image analyzer 504 may compare images, remove a background of an image to obtain a white boarded image, and/or compare the white boarded image to other images. By using the soft decision making processes, image analyzer 504 may eliminate undesirable effects that are associated with color quantization.

The foregoing description of implementations provides illustration, but is not intended to be exhaustive or to limit the implementations to the precise form disclosed. Modifications and variations are possible in light of the above teachings or may be acquired from practice of the teachings. For example, in different implementations, a device may use the soft decision making processes to detect an object, event, or a motion in a video stream (e.g., by detecting an image in the video stream or an image associated with the event in the video stream), In yet another implementation, a device may use the soft decision making processes to test a set-top box controlling command (e.g., by detecting an image at the output of the set-top box).

In addition, while series of blocks have been described with regard to exemplary processes illustrated in FIGS. 6-9, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A non-transitory computer-readable medium including computer-executable instructions, the computer-executable instructions comprising:
   instructions for obtaining, for each pixel of a plurality of pixels, a normalized value, the instructions including instructions for:
      obtaining a first color from one of the plurality of pixels, extracting color components from the first color and a second color,
      determining, for each of the color components, a distance between the first color and the second color, and
      combining the distances for the color components to obtain the normalized value for each pixel, wherein the normalized value equals the combined distances multiplied by a number;
   instructions for obtaining a sum, of the normalized values for the plurality of pixels, that is compared to a threshold, wherein a first image includes the plurality of pixels, wherein a result of the comparison indicates whether the first image matches a second image that includes the second color;
   instructions for determining whether one of the pixels that includes the first color is to be copied to a whiteboard, and displaying the whiteboard via a graphical user interface; and
   instructions for determining whether a third image that includes the pixels is detected as a foreground image of a fourth image that includes the second color and displaying a result of the determination via a graphical user interface.

2. The non-transitory computer-readable medium of claim 1, further comprising instructions for:
   receiving a selection of an area that includes the first image.

3. The non-transitory computer-readable medium of claim 1, wherein the instructions for combining the distances include instructions for:
   multiplying a sum of the distances by a coefficient; and
   when a result of multiplying the sum by the coefficient exceeds a constant, setting the value to be equal to the constant.

4. The non-transitory computer-readable medium of claim 1, wherein the instructions for determining, for each of the color components, a distance include instructions for at least one of:
   computing a difference between a color component of the first color and a corresponding color component of the second color; or
   computing an absolute value of the difference.

5. The non-transitory computer-readable medium of claim 1, wherein the instructions for combining the distances include instructions for:
   adding the distances.

6. The non-transitory computer-readable medium of claim 1, wherein the instructions for determining whether the third image is detected as a foreground image of the fourth image include at least one of:
   instructions for determining how much of the third image matches a background image of the fourth image; or
   instructions for determining how much of the third image does not match the foreground image of the fourth image.

7. The non-transitory computer-readable medium of claim 1, wherein the fourth image includes a whiteboard image.

8. The non-transitory computer-readable medium of claim 1, wherein the first image includes a portion of a frame of a video stream.

9. The non-transitory computer-readable medium of claim 1, further comprising at least one of:
   instructions for detecting a motion in a video stream that includes one of the second image or the foreground image of the fourth image;
   instructions for recognizing images of an object in a video stream, the images of the object including one of the second image or the foreground image of the fourth image;
   instructions for detecting an event in a video stream, the event being associated with the second image or the foreground image of the fourth image; or
   instructions for verifying a command that causes a device to output the second image or the foreground image of the fourth image.

10. The non-transitory computer-readable medium of claim 1, wherein the second color includes:
    an average color of an image in the whiteboard.

11. The non-transitory computer-readable medium of claim 1, wherein the color components include:
    red, green, and blue.

12. A method comprising:
    calculating, for each of a plurality of pixels in a frame of a video stream, a normalized value, including:
       obtaining a first color from the pixel and a second color,
       obtaining color components of the first color and the second color,
       for each of the color components, determining a distance between the color component of the first color and the color component of the second color, and
       adding the distances of the color components to obtain the normalized value for the pixel, wherein the normalized value is equal to the added distances multiplied by a number;
    computing an accumulation of the normalized values obtained for each pixel in a first image within the frame;
    comparing the accumulation to a threshold to determine whether the first image matches a second image that includes the second color;
    displaying a result of determining whether the first image matches the second image via a graphical user interface (GUI);

determining whether one pixel, among the plurality of pixels, that includes the first color is to be copied to a whiteboard, and displaying the whiteboard via the GUI; and determining whether a third image that includes the plurality of pixels is detected as a foreground image of a fourth image that includes the second color and displaying a result of the determination via the GUI.

13. The method of claim 12, wherein obtaining color components includes:

dividing a number representing the first color by a constant; and obtaining a modulo of a result of the division.

14. The method of claim 12, wherein determining a distance includes:

calculating a difference between the component of the first color and the component of the second color.

15. The method of claim 12, wherein accumulating the normalized value includes:

a value obtained by multiplying the accumulation by a constant.

16. The method of claim 12, further comprising:

selecting the first image in the frame via the GUI.

17. A device comprising:

a communication interface to receive a video stream from a remote device; and a processor to:

obtain an image from the video stream, obtain a reference color from a user via a graphical user interface, for each pixel in the image, for each of a plurality of color components, determine a difference between the color component of the pixel and the color component of the reference color, total the differences to obtain a distance, and normalize the distance for the pixel, add the normalized distances of the pixels to obtain a sum, compare the sum to a threshold to determine whether the image matches a reference image that includes the reference color or to determine whether the image is a foreground image of a reference image that includes the reference color, display a result of comparing the sum to the threshold, determine whether one pixel, among pixels of the image, that includes a first color having the plurality of color components is to be copied to a whiteboard, and display the whiteboard via a graphical user interface (GUI); and determine whether a third image that includes pixels of the image is detected as a foreground image of a fourth image that includes the reference color and display a result of the determination via the GUI.

18. The device of claim 17, further comprising:

an infrared output port to issue commands to the remote device.

19. The device of claim 17, wherein the remote device includes:

a set-top box, a digital television that includes a plug-in cable card, or a computer.

20. The device of claim 17, wherein the reference image includes a white boarded image.

* * * * *